United States Patent
Luft et al.

(10) Patent No.: US 9,756,527 B2
(45) Date of Patent: Sep. 5, 2017

(54) COMMUNICATION DEVICES AND FLOW RESTRICTION DEVICES

(71) Applicants: INTEL DEUTSCHLAND GMBH, Neubiberg (DE); INTEL CORPORATION, Santa Clara, CA (US)

(72) Inventors: Achim Luft, Braunschweig (DE); Muthaiah Venkatachalam, Beaverton, OR (US)

(73) Assignees: INTEL CORPORATION, Santa Clara, CA (US); INTEL DEUTSCHLAND GMBH, Neubiberg (DE)

( * ) Notice: Subject to any disclaimer, the term of this patent is extended or adjusted under 35 U.S.C. 154(b) by 757 days.

(21) Appl. No.: 13/633,228

(22) Filed: Oct. 2, 2012

(65) Prior Publication Data
US 2013/0094360 A1   Apr. 18, 2013

Related U.S. Application Data

(60) Provisional application No. 61/542,731, filed on Oct. 3, 2011.

(51) Int. Cl.
*H04W 28/12* (2009.01)
*H04L 12/26* (2006.01)
*H04L 29/06* (2006.01)

(52) U.S. Cl.
CPC ........... *H04W 28/12* (2013.01); *H04L 43/028* (2013.01); *H04L 63/029* (2013.01); *H04L 63/0236* (2013.01); *H04L 63/0428* (2013.01)

(58) Field of Classification Search
CPC ... H04L 63/08; H04L 63/0892; H04L 63/104; H04L 63/0272; H04L 63/164; H04L 63/0227; H04L 63/0236; H04L 63/0263; H04L 63/0281; H04L 63/062; H04L 63/10; H04L 63/102; H04L 63/1408; H04L 63/166
USPC ..... 726/13–14; 713/153, 168, 171; 370/230, 370/252, 254, 338, 352, 389, 401; 455/461; 709/203, 223, 227, 238, 217, 709/205, 229, 245, 201, 219, 225, 226, 709/228, 232, 243, 246, 250
See application file for complete search history.

(56) References Cited

U.S. PATENT DOCUMENTS

| | | | |
|---|---|---|---|
| 8,370,921 B2 * | 2/2013 | Duan et al. ...................... 726/15 |
| 8,402,540 B2 * | 3/2013 | Kapoor .................. G06F 9/505 |
| | | | 709/224 |
| 8,510,466 B2 * | 8/2013 | Goodman et al. ............ 709/238 |
| 2005/0063381 A1 * | 3/2005 | Kayalackakom ... H04L 63/0485 |
| | | | 370/389 |
| 2009/0248800 A1 * | 10/2009 | Chu et al. ..................... 709/204 |

* cited by examiner

*Primary Examiner* — Ayaz Sheikh
*Assistant Examiner* — Debebe Asefa
(74) *Attorney, Agent, or Firm* — Schwabe, Williamson & Wyatt, P.C.

(57) ABSTRACT

A communication device may be provided. The communication device may include: a packet generator configured to generate a packet including data for a second communication device and a header including an identifier identifying a communication service for the data and a transmitter configured to transmit the packet via a flow restriction device to the second communication device.

4 Claims, 4 Drawing Sheets

COMMUNICATION DEVICES AND FLOW RESTRICTION DEVICES

CROSS-REFERENCE TO RELATED APPLICATIONS

This application claims the benefit of U.S. Provisional Application Ser. No. 61/542,731, which was filed on Oct. 3, 2012 and is incorporated herein by reference in its entirety.

TECHNICAL FIELD

Aspects of this disclosure relate generally to communication devices and flow restricting devices.

BACKGROUND

A communication device may communicate with another communication device. For example in order to enhance security of one or both of the communication devices, data exchanged between the communication devices may be routed via a flow restriction device, for example a firewall. The flow restricting device may decide whether to block the data exchange or to allow the data exchange. However, it may be cumbersome for a user of the communication device in case data exchange is blocked. Thus, there is the need for a communication system with a flow restricting device that does not filter any data that should not be filtered.

SUMMARY

A communication device may be provided. The communication device may include: a packet generator configured to generate a packet including data for a second communication device and a header including an identifier identifying a communication service for the data; and a transmitter configured to transmit the packet via a flow restricting device to the second communication device.

A communication device may be provided. The communication device may include: a message generator configured to generate a message for setting up a communication session with a second communication device and the message may include an identifier identifying a communication service for the communication session; and a transmitter configured to transmit the message via a flow restricting device to the second communication device.

A flow restricting device may be provided. The flow restricting device may include: a receiver configured to receive data from a communication device, wherein the data include an indication to the flow restricting device whether to restrict a flow of the data or not; an indication extraction circuit configured to extract the indication from the data; and a filter configured to restrict the flow of the data based on the indication.

A method for controlling a communication device may be provided. The method may include: generating a message for setting up a communication session with a second communication device and the message may include an identifier identifying a communication service for the communication session; and transmitting the message via a flow restricting device to the second communication device.

A method for controlling a flow restricting device may be provided. The method may include: receiving data from a communication device, wherein the data include an indication to the flow restricting device whether to restrict a flow of the data or not; extracting the indication from the data; and restricting the flow of the data based on the indication.

BRIEF DESCRIPTION OF THE DRAWINGS

In the drawings, like reference characters generally refer to the same parts throughout the different views. The drawings are not necessarily to scale, emphasis instead generally being placed upon illustrating the principles of various aspects of this disclosure. In the following description, various aspects of this disclosure are described with reference to the following drawings, in which.

DESCRIPTION

Figure 1:
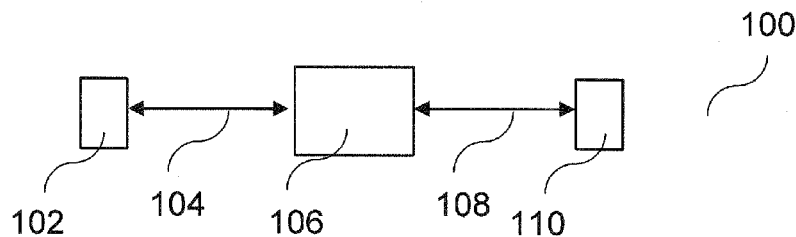
FIG. 1 shows a communication system.

The following detailed description refers to the accompanying drawings that show, by way of illustration, specific details and aspects of the disclosure in which the invention may be practiced. These aspects of the disclosure are described in sufficient detail to enable those skilled in the art to practice the invention. Other aspects of the disclosure may be utilized and structural, logical, and electrical changes may be made without departing from the scope of the invention. The various aspects of the disclosure are not necessarily mutually exclusive, as some aspects of the disclosure may be combined with one or more other aspects of the disclosure to form new aspects of the disclosure.

The terms "coupling" or "connection" are intended to include a direct "coupling" or direct "connection" as well as an indirect "coupling" or indirect "connection", respectively. Indirect "coupling" or indirect "connection" may be understood to be a coupling or a connection between two elements, wherein further elements are provided in between the coupled or connected elements.

The word "exemplary" is used herein to mean "serving as an example, instance, or illustration". Any aspect of this disclosure or design described herein as "exemplary" is not necessarily to be construed as preferred or advantageous over other aspect of this disclosure or designs.

The term "protocol" is intended to include any piece of software, that is provided to implement part of any layer of the communication definition.

A communication device (which may also be referred to as communication end device or end device) as referred to herein may be a device configured for wired communication, for example a desktop computer or laptop, or for wireless communication, for example a radio communication device. Furthermore, a radio communication device may be an end-user mobile device (MD). A radio communication device may be any kind of mobile radio communication device, mobile telephone, personal digital assistant, mobile computer, or any other mobile device configured for communication with a mobile communication base station (BS) or an access point (AP) and may be also referred to as a User Equipment (UE), a mobile station (MS) or an advanced mobile station (advanced MS, AMS), for example in accordance with IEEE 802.16m. A flow restriction device may for example be a network device (or network entity) with IP (internet protocol) flow restrictions. The flow restriction device may for example be a firewall, a proxy, an IDS (intrusion detection system), an adult content filter and/or a child protection.

The communication device may include a memory which may for example be used in the processing carried out by the communication device. The flow restriction device may include a memory which may for example be used in the processing carried out by the flow restriction device. A memory may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, for example a floating gate memory, a charge trapping memory, an MRAM (Magnetoresistive Random Access Memory) or a PCRAM (Phase Change Random Access Memory).

As used herein, a "circuit" may be understood as any kind of a logic implementing entity, which may be special purpose circuitry or a processor executing software stored in a memory, firmware, or any combination thereof. Furthermore, a "circuit" may be a hard-wired logic circuit or a programmable logic circuit such as a programmable processor, for example a microprocessor (for example a Complex Instruction Set Computer (CISC) processor or a Reduced Instruction Set Computer (RISC) processor). A "circuit" may also be a processor executing software, for example any kind of computer program, for example a computer program using a virtual machine code such as for example Java. Any other kind of implementation of the respective functions which will be described in more detail below may also be understood as a "circuit". It may also be understood that any two (or more) of the described circuits may be combined into one circuit.

Description is provided for devices, and description is provided for methods. It will be understood that basic properties of the devices also hold for the methods and vice versa. Therefore, for sake of brevity, duplicate description of such properties may be omitted.

It will be understood that any property described herein for a specific device may also hold for any device described herein. It will be understood that any property described herein for a specific method may also hold for any method described herein.

FIG. 1 shows a communication system 100. A first communication device 102 may desire to communicate with a second communication device 110. Direct connection between the first communication device 102 and the second communication device 110 may not be possible. Instead, the data sent by the first communication device 102 may be provided to the second communication device 110 via a flow restriction device 106 (for example a firewall), like indicated by arrows 104 and 108. It will be understood that other devices (like for example routers, or other components of a communication network) may furthermore be provided between the first communication device 102 and the second communication device 110, although not shown in FIG. 1.

Private or corporate networks may be mostly behind a Network Address Translation Router (NAT Router) and a Firewall (FW). A NAT Router may translate inner LAN (local area network) IP (internet protocol) addresses into the outbound IP address in order to have several devices in a Local Area Network (LAN) with internal IP addresses connected to the internet via an outbound IP address. The Firewall may enforce a set of rules explicitly allowing specific connections in one or both directions and denying all others.

Means may be provided to traverse a NAT router and/or to tunnel a firewall in order to enable services from inside a LAN to the internet and vice versa. A mechanism to tunnel a firewall is to setup an encrypted tunnel via ports of the IP protocol that are used for common services like HTTP (hypertext transfer protocol; port 80) or HTTPS (hypertext transfer protocol secure; port 443). These ports are may often not be blocked by firewalls.

A service tunneled with a tunnel protocol like IPsec (internet protocol security) or SSL (secure sockets layer), which are just examples of tunnel protocols (and there may be various different tunnel protocols), may be hard to be identified by security elements in a private or corporate network. Therefore tunnel protocols may often be blocked.

By what is described here, the problem to tunnel unidentified services may be solved by introducing a service identifier into the tunnel protocol.

A kind of (communication) service that may be tunneled may be indicated in the tunnel protocol. This may be done via a dedicated service indicator in the header of a tunnel protocol (e.g. IPsec tunnel mode) or during the bootstrapping or handshake phase of tunnel protocol like SSL.

In the following, a service indicator per packet will be described.

For example in case of IPsec, the service indicator may be added to the ESP (Encapsulating Security Payload) header or before the ESP header. In IPsec tunnel mode, the original IP packet may be encrypted with parameters signaled in the ESP header.

Figure 2:
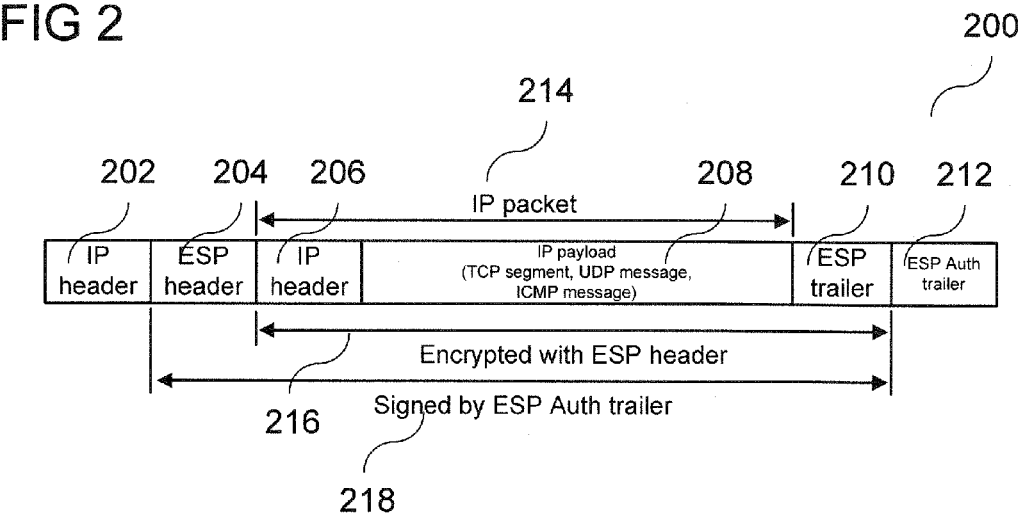
FIG. 2 shows a packet format.

FIG. 2 shows a packet format 200, for example of an ESP packet. An original IP packet 214, including an IP header 206 and IP payload 208 (for example including a TCP (Transmission Control Protocol) segment, a UDP (User Datagram Protocol) message, or an ICMP (Internet Control Message Protocol) message) may be followed by an ESP trailer 210. The IP packet and the ESP trailer 210 may be encrypted with an ESP header 204, like indicated by arrow 216. The ESP header 204 may be provided before the IP packet 214. The ESP header 204 and the IP packet 214 may be signed by an ESP auth (Authentication) trailer 212, like indicated by arrow 218. The ESP auth trailer 212 may be provided after the ESP trailer 210. A further IP header 202 for the signed and encrypted original IP packet 214 may be provided in the beginning of the ESP packet.

Figure 9:
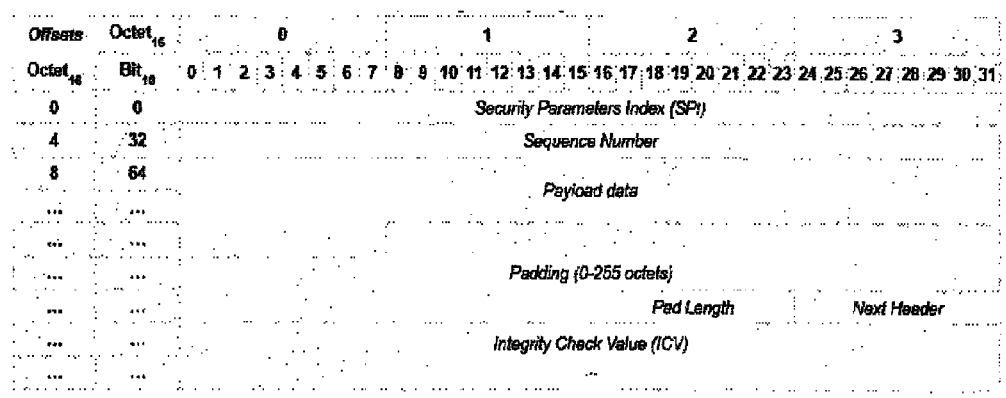
FIG. 9 shows a diagram of an ESP packet.

An ESP packet may be as described in FIG. 9.

The Security Parameters Index (which may include or may be 32 bits) may include or may be an arbitrary value which may be used (together with the source IP address) to identify the security association of the sending party.

The Sequence Number (which may include or may be 32 bits) may include or may be a monotonically increasing sequence number (for example incremented by 1 for every packet sent), for example to protect against replay attacks. There may be a separate counter kept for every security association.

The Payload data (which may be of variable size) may include or may be the protected contents of the original IP packet, for example including any data used to protect the contents (e.g. an Initialisation Vector for the cryptographic algorithm). The type of content that was protected may be indicated by the Next Header field.

The Padding (which may include or may be between 0 and 255 octets) may include or may be padding for encryption, for example to extend the payload data to a size that fits the encryption's cypher block size, and for example to align the next field.

The Pad Length (which may include or may be 8 bits) may include or may be the size of the padding in octets.

The Next Header (which may include or may be 8 bits) may include or may be a type of the next header. The value may be taken from a list of IP protocol numbers, for example a list used for IPv4 and/or IPv6.

The Integrity Check Value (which may include or may be multiple of 32 bits) may include or may be a variable length check value. It may include or may be padding to align the field to an 8-octet boundary for IPv6, or a 4-octet boundary for IPv4.

A service indicator may be added to the ESP header as a parameter, for example between the sequence number and the payload data. Alternatively, the indicator may be added as a vendor specific TLV (type length value) before the ESP header. It may be an 32 bit value in order to identify the kind of service (for example IMS (IP (internet protocol) multimedia subsystem), or VoIP (voice over IP)). Every registered service may be indexed and the index may be sent in each tunneled IP packet. Although this may be a overhead, it may help security elements in a local network to distinguish the tunnels and identify the services being tunneled. To avoid overhead in case such an indicator is not needed, there may be a benefit in signaling in only one byte (e.g. the first byte in the service indicator field) whether the service indicator is present or the payload starts right after this signaling byte.

In the following, a service indicator per session will be described.

Not all tunnel protocols may have headers that may be used to add a service indicator. For example SSL does not. An SSL tunnel may be desired to be setup first. This bootstrapping or handshake phase may be based on certificates and a PKI (public key infrastructure). Therefore, in order to provide an inventive service indicator, the service may be indicated during the handshake procedure. This may provide that the signaling overhead may be minimized because the service indicator may be just sent once during handshake and not in every single packet. Likewise the service indicator may be added to IKEv2 (Internet Key Exchange) messaging as opposed to or in addition to being added in every single IPSec packet. Similar mechanisms may be applied for PPTP (Point-to-Point Tunneling Protocol) and L2TP (Layer 2 Tunneling Protocol) tunnel establishment.

A number of records (messages of the SSL protocol during handshake) may be defined to perform the handshake phase of SSL. The handshake records may be:
  SSL3_MT_HELLO_REQUEST;
  SSL3_MT_CLIENT_HELLO;
  SSL3_MT_SERVER_HELLO;
  SSL3_MT_CERTIFICATE;
  SSL3_MT_SERVER_KEY_EXCHANGE;
  SSL3_MT_CERTIFICATE_REQUEST;
  SSL3_MT_SERVER_DONE;
  SSL3_MT_CERTIFICATE_VERIFY;
  SSL3_MT_CLIENT_KEY_EXCHANGE; and
  SSL3_MT_FINISHED.

In the example of SSL, the service indicator may be placed in the command specific data field of the SSL3_MT_CLIENT_HELLO record.

The format of every handshake record may be as follows:
  Byte 0=SSL record type=22 (SSL3_RT_HANDSHAKE);
  Bytes 1 to 2=SSL version (major/minor);
  Bytes 3 to 4=Length of data in the record (excluding the header itself);
  Byte 5=Handshake type;
  Bytes 6 to 8=Length of data to follow in this record; and
  Bytes 9 to n=Command-specific data.

An index of IP services like HTTP, VoIP, IMS, P2P (peer to peer) may be provided. A service indicator may be added to tunnel protocols, for example in every IP packet like in IPsec, or for example during handshake or bootstrapping. This may enable network elements (for example security related elements like FW and NAT router in LANs) to identify the kind of service the tunnel is established for. This may enable services to tunnel FWs that would be blocked in case they can't be identified by the FW. This may enable FWs to block tunneled services in general but allow specific services.

Figure 3:
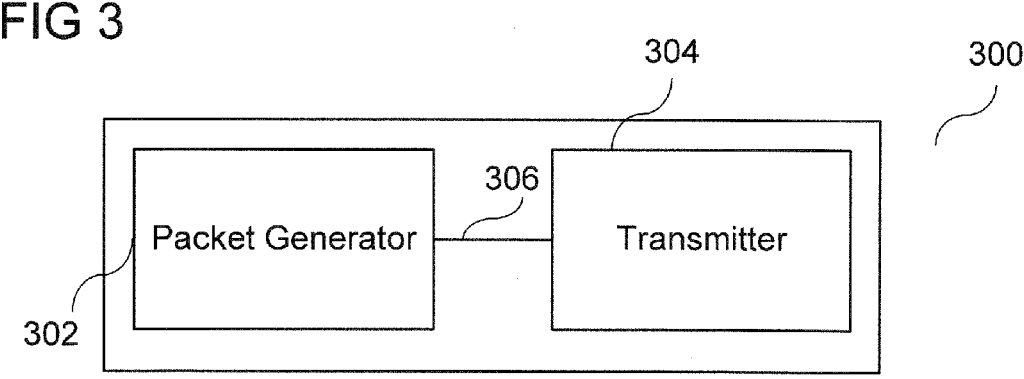
FIG. 3 shows a communication device with a packet generator.

FIG. 3 shows a communication device 300. The communication device 300 may include a packet generator 302 configured to generate a packet including data for a second communication device (not shown) and a header including an identifier identifying a communication service for the data. The communication device 300 may further include a transmitter 304 configured to transmit the packet via flow restriction device to the second communication device. The packet generator 302 and the transmitter 304 may be coupled with each other, e.g. via a connection 306, for example an optical connection or an electrical connection, such as e.g. a cable or a computer bus or via any other suitable electrical connection to exchange electrical signals.

The packet may include or may be an IPsec packet.

The packet may include an ESP header.

The packet generator 302 may further be configured to include the identifier to the ESP header or before the ESP header. The encapsulating security payload header may include the identifier. A portion of the packet before the encapsulating security payload header may include the identifier.

The identifier may identify a type (or a kind) of the communication service.

The type of communication service may include or may be at least one of an internet protocol multimedia subsystem service, a voice over internet protocol service, a hyper text transport protocol service, and a peer to peer service. For example, the type of communication service may be a communication service according to 3GPP (Third Generation Project Partnership) or a communication service different from a communication service according to 3GPP.

Figure 4:
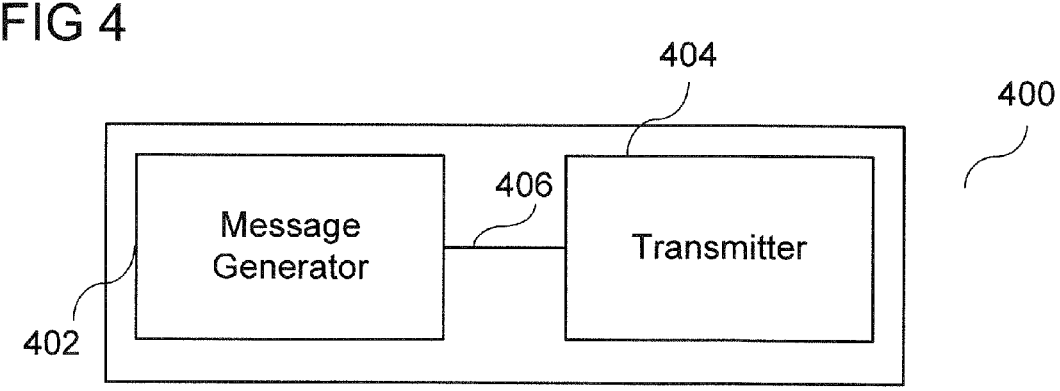
FIG. 4 shows a communication device with a message generator.

FIG. 4 shows a communication device 400. The communication device 400 may include a message generator 402 configured to generate a message for setting up a communication session with a second communication device (not shown). The message may include an identifier identifying a communication service for the communication session. The communication device 400 may further include a transmitter 404 configured to transmit the message via a flow restricting device to the second communication device. The message generator 402 and the transmitter 404 may be coupled with each other, e.g. via a connection 406, for example an optical connection or an electrical connection, such as e.g. a cable or a computer bus or via any other suitable electrical connection to exchange electrical signals.

The message may include or may be a security bootstrap message, for example a SSL handshake message.

The message may include or may be a IKEv2 message.

The communication session may include a tunnel, for example a secure internet protocol tunnel.

The communication session may include or may be at least one of a SSL communication session; and a VPN (virtual private network) communication session.

The identifier may identify a type of the communication service.

The type of communication service may include or may be an internet protocol multimedia subsystem service, a voice over Internet protocol service, a hyper text transport protocol service, and/or a peer to peer service. For example, the type of communication service may be a communication service according to 3GPP (Third Generation Project Partnership) or a communication service different from a communication service according to 3GPP.

Figure 5:
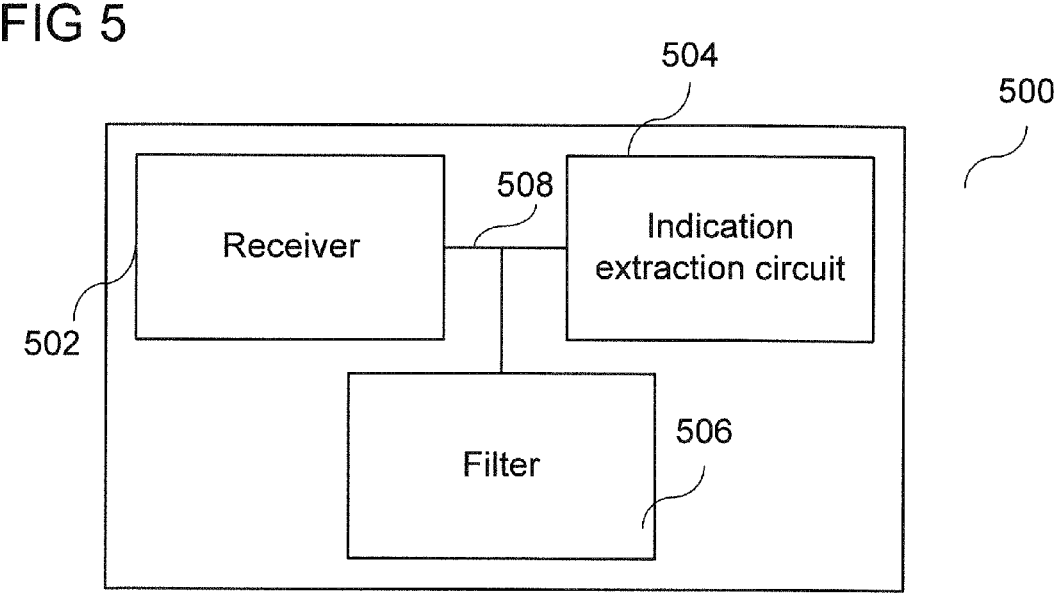
FIG. 5 shows a flow restriction device.

FIG. 5 shows a flow restricting device 500. The flow restricting device 500 may include a receiver 502 configured to receive data from a communication device (not shown). The data may include or may be an indication to the flow restricting device 500 whether to restrict a flow of the data or not, for example whether to filter the data or not. The flow restricting device 500 may further include an indication extraction circuit 504 configured to extract the indication from the data. The flow restricting device 500 may further include a filter 506 configured to restrict the flow of the data, for example filter the data, based on the indication. The receiver 502, the indication extraction circuit 504, and the filter 506 may be coupled with each other, e.g. via a connection 508, for example an optical connection or an electrical connection, such as e.g. a cable or a computer bus or via any other suitable electrical connection to exchange electrical signals.

The data may include or may be a packet. The data may include or may be data for a second communication device (not shown). The data may include an identifier. The identifier may identify a communication service for the data in a header of the packet. The indication may include or may be the identifier.

The packet may include or may be an IPsec packet.

The packet may include an ESP header.

The identifier may be included in the ESP header or before the ESP header. The encapsulating security payload header may include the identifier. A portion of the packet before the encapsulating security payload header may include the identifier.

The data may include or may be a message for setting up a communication session with a second communication device (not shown). The message may include an identifier. The identifier may identify a communication service for the communication session.

The message may include or may be a security bootstrap message, for example a SSL handshake message.

The message may include or may be a IKEv2 message.

The communication session may include a tunnel, for example a secure internet protocol tunnel.

The communication session may include or may be a SSL communication session and/or a VPN communication session.

The indicator may include or may be an identifier identifying a communication service for the data.

The identifier may identify a type of the communication service.

The type of communication service may include or may be an internet protocol multimedia subsystem service, a voice over internet protocol service, a hyper text transport protocol service, and/or a peer to peer service. For example, the type of communication service may be a communication service according to 3GPP (Third Generation Project Partnership) or a communication service different from a communication service according to 3GPP.

Figure 6:
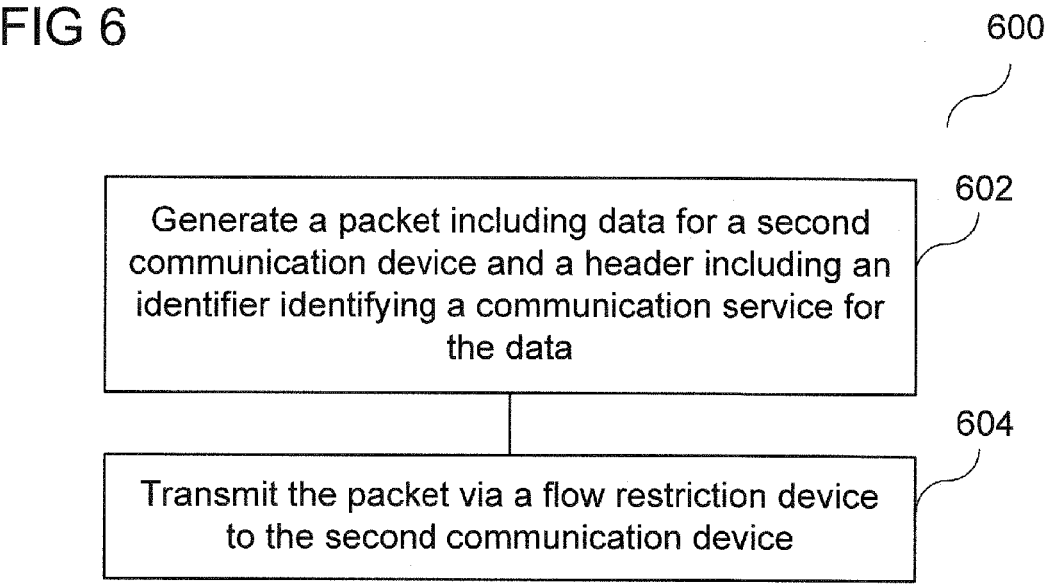
FIG. 6 shows a flow diagram illustrating a method for controlling a communication device with a packet generator.

FIG. 6 shows a flow diagram 600 illustrating a method for controlling a communication device. In 602, a packet generator of the communication device may generate a packet including data for a second communication device and a header including an identifier identifying a communication service for the data. In 604, a transmitter of the communication device may transmit the packet via a flow restricting device to the second communication device.

The packet may include or may be an IPsec packet.

The packet may include an ESP header.

The packet generator may further be configured to include the identifier at to the ESP header or before the ESP header. The encapsulating security payload header may include the identifier. A portion of the packet before the encapsulating security payload header may include the identifier.

The identifier may identify a type of the communication service.

The type of communication service may include or may be at least one of an internet protocol multimedia subsystem service, a voice over internet protocol service, a hyper text transport protocol service, and a peer to peer service. For example, the type of communication service may be a communication service according to 3GPP (Third Generation Project Partnership) or a communication service different from a communication service according to 3GPP.

Figure 7:
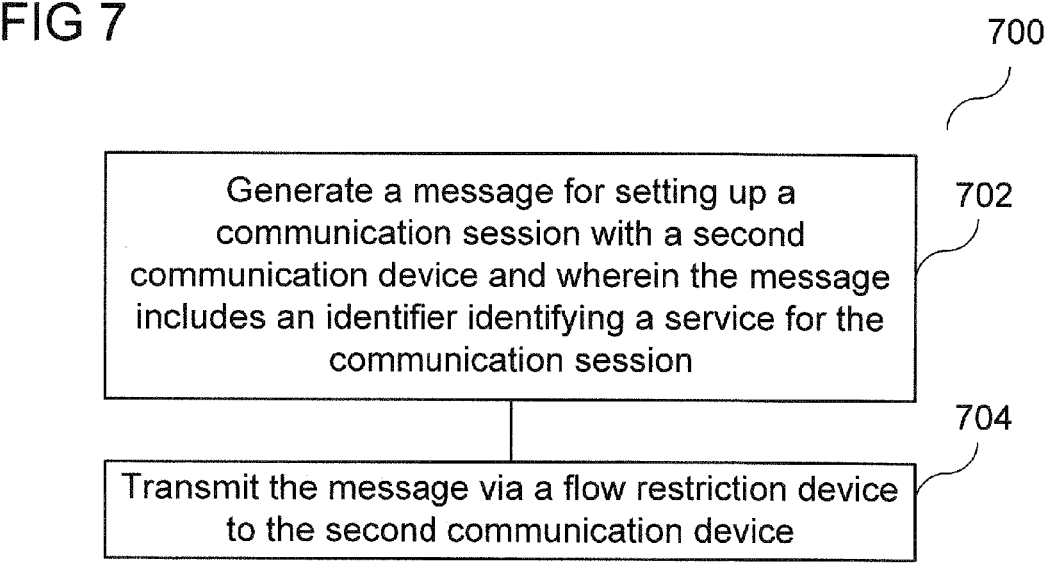
FIG. 7 shows a flow diagram illustrating a method for controlling a communication device with a message generator.

FIG. 7 shows a flow diagram 700 illustrating a method for controlling a communication device. In 702, a message generator of the communication device may generate a message for setting up a communication session with a second communication device. The message may include an identifier identifying a communication service for the communication session. In 704, a transmitter of the communication device may transmit the message via a flow restricting device to the second communication device.

The message may include or may be a security bootstrap message, for example a SSL handshake message.

The message may include or may be a IKEv2 message.

The communication session may include a tunnel, for example a secure internet protocol tunnel.

The communication session may include or may be at least one of a SSL communication session; and a VPN communication session.

The identifier may identify a type of the communication service.

The type of communication service may include or may be an interne protocol multimedia subsystem service, a voice over internet protocol service, a hyper text transport protocol service, and/or a peer to peer service. For example, the type of communication service may be a communication service according to 3GPP (Third Generation Project Partnership) or a communication service different from a communication service according to 3GPP.

Figure 8:
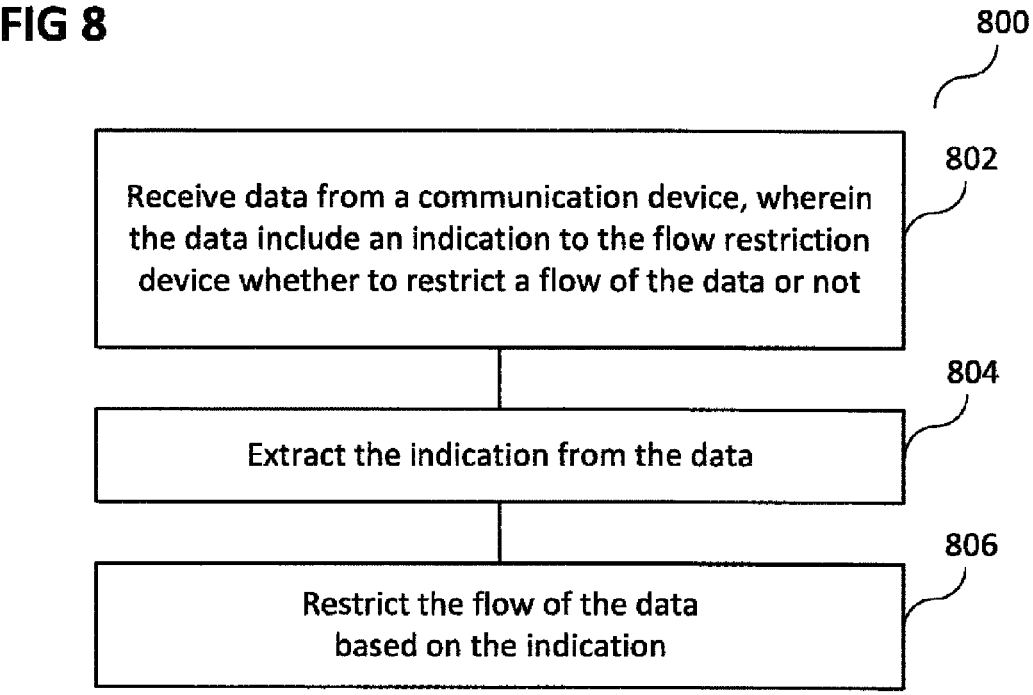
FIG. 8 shows a flow diagram illustrating a method for controlling a flow restriction device.

FIG. 8 shows a flow diagram 800 illustration a method for controlling a flow restricting device. In 802, a receiver of the flow restricting device may receive data from a communication device. The data may include or may be an indication to the flow restricting device whether restrict a flow of the data or not, for example to filter the data or not. In 804, an indication extraction circuit of the flow restricting device may extract the indication from the data. In 806, a filter of the flow restricting device may restrict the flow of the data, for example filter the data, based on the indication.

The data may include or may be a packet. The data may include or may be data for a second communication device (not shown). The data may include an identifier. The identifier may identify a communication service for the data in a header of the packet. The indication may include or may be the identifier.

The packet may include or may be an IPsec packet.

The packet may include an ESP header.

The identifier may be included in the ESP header or before the ESP header. The encapsulating security payload header may include the identifier. A portion of the packet before the encapsulating security payload header may include the identifier.

The data may include or may be a message for setting up a communication session with a second communication device (not shown). The message may include an identifier. The identifier may identify a communication service for the communication session.

The message may include or may be a security bootstrap message, for example a SSL handshake message.

The message may include or may be a IKEv2 message.

The communication session may include or may be a tunnel, for example a secure internet protocol tunnel.

The communication session may include or may be a SSL communication session and/or a VPN communication session.

The indicator may include or may be an identifier identifying a communication service for the data.

The identifier may identify a type of the communication service.

The type of communication service may include or may be an internet protocol multimedia subsystem service, a voice over internet protocol service, a hyper text transport protocol service, and/or a peer to peer service. For example, the type of communication service may be a communication service according to 3GPP (Third Generation Project Partnership) or a communication service different from a communication service according to 3GPP.

A radio communication device may include circuits for authentication for outgoing data. This may provide that an identifier or an indication may not be falsified by the radio communication device.

A communication device may be provided. The communication device may include a packet generator configured to generate a packet including data to be sent to another communication device. The packet generator may further be configured to include into a header of the packet an identifier identifying a communication service to which, the data belong. The communication device may further include a sender configured to send the packet via flow restriction device to the other communication device.

A communication device may be provided. The communication device may include a message generator configured to generate a message for setting up a communication session with another communication device. The message generator may further be configured to include into the message an identifier identifying a communication service to which the communication session belongs. The communication device may further include a sender configured to send the message via a flow restricting device to the other communication device.

A flow restricting device may be provided. The flow restricting device may include a receiver configured to receive data from a communication device. The data may include or may be an indication to the flow restricting device whether to restrict a flow of the data or not, for example whether to filter the data or not. The flow restricting device may further include an indication extraction circuit configured to extract the indication from the data. The flow restricting device may further include a filter configured to restrict the flow of the data, for example filter the data, based on the indication.

A method for controlling a communication device may be provided. A packet generator of the communication device may generate a packet including data to be sent to another communication device. The packet generator may further include into a header of the packet an identifier identifying a communication service to which the data belong. A sender of the communication device may send the packet via a flow restricting device to the other communication device.

A method for controlling a communication device may be provided. A message generator of the communication device may generate a message for setting up a communication session with another communication device. The message generator may further include into the message an identifier identifying a communication service to which the communication session belongs. A sender of the communication device may send the message via a flow restricting device to the other communication device.

A method for controlling a flow restricting device may be provided. A receiver of the flow restricting device may receive data from a communication device. The data may include or may be an indication to the flow restricting device whether restrict a flow of the data or not, for example to filter the data or not. An indication extraction circuit of the flow restricting device may extract the indication from the data. A filter of the flow restricting device may restrict the flow of the data, for example filter the data, based on the indication.

Any one of the devices, for example the radio communication devices and/or the flow restricting devices, described above may be configured according to at least one of the following radio access technologies: a Bluetooth radio communication technology, an Ultra Wide Band (UWB) radio communication technology, and/or a Wireless Local Area Network radio communication technology (for example according to an IEEE 802.11 (for example IEEE 802.11n) radio communication standard)), IrDA (Infrared Data Association), Z-Wave and ZigBee, HiperLAN/2 ((High PErformance Radio LAN; an alternative ATM-like 5 GHz standardized technology), IEEE 802.11a (5 GHz), IEEE 802.11g (2.4 GHz), IEEE 802.11n, IEEE 802.11VHT (VHT=Very High Throughput), Worldwide Interoperability for Microwave Access (WiMax) (for example according to an IEEE 802.16 radio communication standard, for example WiMax fixed or WiMax mobile), WiPro, HiperMAN (High Performance Radio Metropolitan Area Network) and/or IEEE 802.16m Advanced Air Interface, a Global System for Mobile Communications (GSM) radio communication technology, a General Packet Radio Service (CPRS) radio communication technology, an Enhanced Data Rates for GSM Evolution (EDGE) radio communication technology, and/or a Third Generation Partnership Project (3GPP) radio communication technology (for example UMTS (Universal Mobile Telecommunications System), FOMA (Freedom of Multimedia Access), 3GPP LTE (Long Term Evolution), 3GPP LTE Advanced (Long Term Evolution Advanced)), CDMA2000 (Code division multiple access 2000), CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband Code Division Multiple Access (Universal Mobile Telecommunications System)), HSPA (High Speed Packet Access), HSDPA (High-Speed Downlink Packet Access), HSUPA (High-Speed Uplink Packet Access), HSPA+(High Speed Packet Access Plus), UMTS-TDD (Universal Mobile Telecommunications System—Time-Division Duplex), TD-CDMA (Time Division—Code Division Multiple Access), TD-CDMA (Time Division—Synchronous Code Division Multiple Access), 3GPP Rel. 8 (Pre-4G) (3rd Generation Partnership Project Release 8 (Pre-4th Generation)), UTRA (UMTS Terrestrial Radio Access), E-UTRA (Evolved UMTS Terrestrial Radio Access), LTE Advanced (4G) (Long Term Evolution Advanced (4th Generation)), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, "car radio phone"), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), CSD (Circuit Switched Data), PHS (Personal Handy-phone System), WiDEN (Wideband Integrated Digital Enhanced Network), iBurst, Unlicensed Mobile Access (UMA, also referred to as also referred to as 3GPP Generic Access Network, or GAN standard).

While the invention has been particularly shown and described with reference to specific aspects of this disclosure, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A network communication device comprising:
   a packet generator to generate a packet including data for a remote communication device and a header that includes an identifier to identify a type of communication service for the data, wherein the type is an internet protocol multimedia subsystem service, a voice over internet protocol service, a hypertext transport protocol service, or a peer-to-peer service; and
   a transmitter to transmit, over a secure internet protocol tunnel, the packet via a flow restriction device to the remote communication device, wherein the identifier is to enable the flow restriction device to determine the type of communication service for which the secure internet protocol tunnel is established and either prevent or allow transmission of the packet through the secure internet protocol tunnel to the remote communication device based on the type of communication service,
   wherein the packet comprises an encapsulating security payload header and a portion of the packet before the encapsulating security payload header comprises the identifier.

2. The network communication device of claim 1, wherein the packet comprises an internet protocol security packet.

3. A flow restriction device comprising: a receiver to receive data being transmitted from a first communication device to a second communication device, wherein the data include an indicator that identifies a type of communication service for the data, and wherein the type is an internet protocol multimedia subsystem service, a voice over internet protocol service, a hypertext transport protocol service, or a peer-to-peer service; an indication extraction circuit to extract the indicator from the data; and a filter to either prevent or allow transmission of the data to the second communication device based on the type of communication service identified by the indicator, wherein the data comprises an encapsulating security payload packet having an encapsulating security payload header and a portion of the encapsulating security payload packet before the encapsulating security payload header comprises the indicator.

4. The flow restriction device of claim 3, wherein the data comprises a message for initiation of a communication session with the second communication device.

* * * * *